(12) United States Patent
Jung et al.

(10) Patent No.: US 7,690,015 B2
(45) Date of Patent: Mar. 30, 2010

(54) PSIP CONVERTER AND CONVERTING METHOD AND DIGITAL CABLE TELEVISION BROADCASTING SYSTEM USING THE PSIP CONVERTER

(75) Inventors: Joon-Young Jung, Daejeon (KR);
Joon-Young Choi, Daejeon (KR);
Byung-Jun Bae, Daejeon (KR);
O-Hyung Kwon, Daejeon (KR);
Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 2587 days.

(21) Appl. No.: 10/029,943

(22) Filed: Dec. 31, 2001

(65) Prior Publication Data

US 2003/0081686 A1 May 1, 2003

(30) Foreign Application Priority Data

Nov. 1, 2001 (KR) .............................. 2001-67867

(51) Int. Cl.
*H04N 7/20* (2006.01)
(52) U.S. Cl. .............................. 725/68; 725/78; 725/91; 375/240.5
(58) Field of Classification Search .................. 725/68, 725/78, 91; 375/240.25
See application file for complete search history.

(56) References Cited

U.S. PATENT DOCUMENTS

| | | | | |
|---|---|---|---|---|
| 4,513,373 A * | 4/1985 | Sheets | ......................... | 709/236 |
| 5,740,214 A * | 4/1998 | Rebec et al. | ................. | 375/377 |
| 5,850,218 A * | 12/1998 | LaJoie et al. | .................. | 725/45 |
| 6,038,232 A * | 3/2000 | Jung et al. | ............. | 370/395.64 |
| 6,078,800 A * | 6/2000 | Kasser | ........................ | 455/303 |
| 6,621,528 B1 * | 9/2003 | Kessler et al. | ................ | 348/734 |
| 6,700,624 B2 * | 3/2004 | Yun | ........................... | 348/555 |
| 6,785,903 B1 * | 8/2004 | Kuh | ........................... | 725/50 |
| 6,870,808 B1 * | 3/2005 | Liu et al. | ..................... | 370/203 |
| 2002/0120790 A1 * | 8/2002 | Schwalb | ...................... | 709/328 |
| 2002/0145679 A1 * | 10/2002 | Barreyro et al. | ............. | 348/723 |
| 2003/0026424 A1 * | 2/2003 | McGarrahan et al. | ....... | 380/255 |
| 2003/0103446 A1 * | 6/2003 | Negishi et al. | .............. | 370/208 |

FOREIGN PATENT DOCUMENTS

| | | |
|---|---|---|
| KR | 1999-0036286 | 9/1999 |
| KR | 2002-96647 | 12/2002 |

* cited by examiner

*Primary Examiner*—Hunter Lonsberry
*Assistant Examiner*—Nnenna N Ekpo
(74) *Attorney, Agent, or Firm*—Lowe Hauptman Ham & Berner, LLP

(57) ABSTRACT

A PSI converter includes: a protocol data extractor, a protocol data converter, a protocol data inserter, and a system controller. The protocol data extractor is configured for demultiplexing a terrestrial broadcasting TS or a satellite broadcasting TS, and extracting audio/video data and PSIP/PSI data or audio/video data and SI/PSI data from the terrestrial broadcasting TS or the satellite broadcasting TS, respectively. The protocol data converter is configured for converting the PSIP/PSI data or the SI/PSI data into PSIP/PSI data of a corresponding digital cable television broadcasting standard. The protocol data inserter is configured for inserting the digital cable television broadcasting standard PSIP/PSI data into the audio/video data extracted by the protocol data extractor though TS multiplexing, and generating a digital cable broadcasting TS. The system controller is configured for checking the protocol data extractor, the protocol data converter, and the protocol data inserter, and controlling their operation.

12 Claims, 4 Drawing Sheets

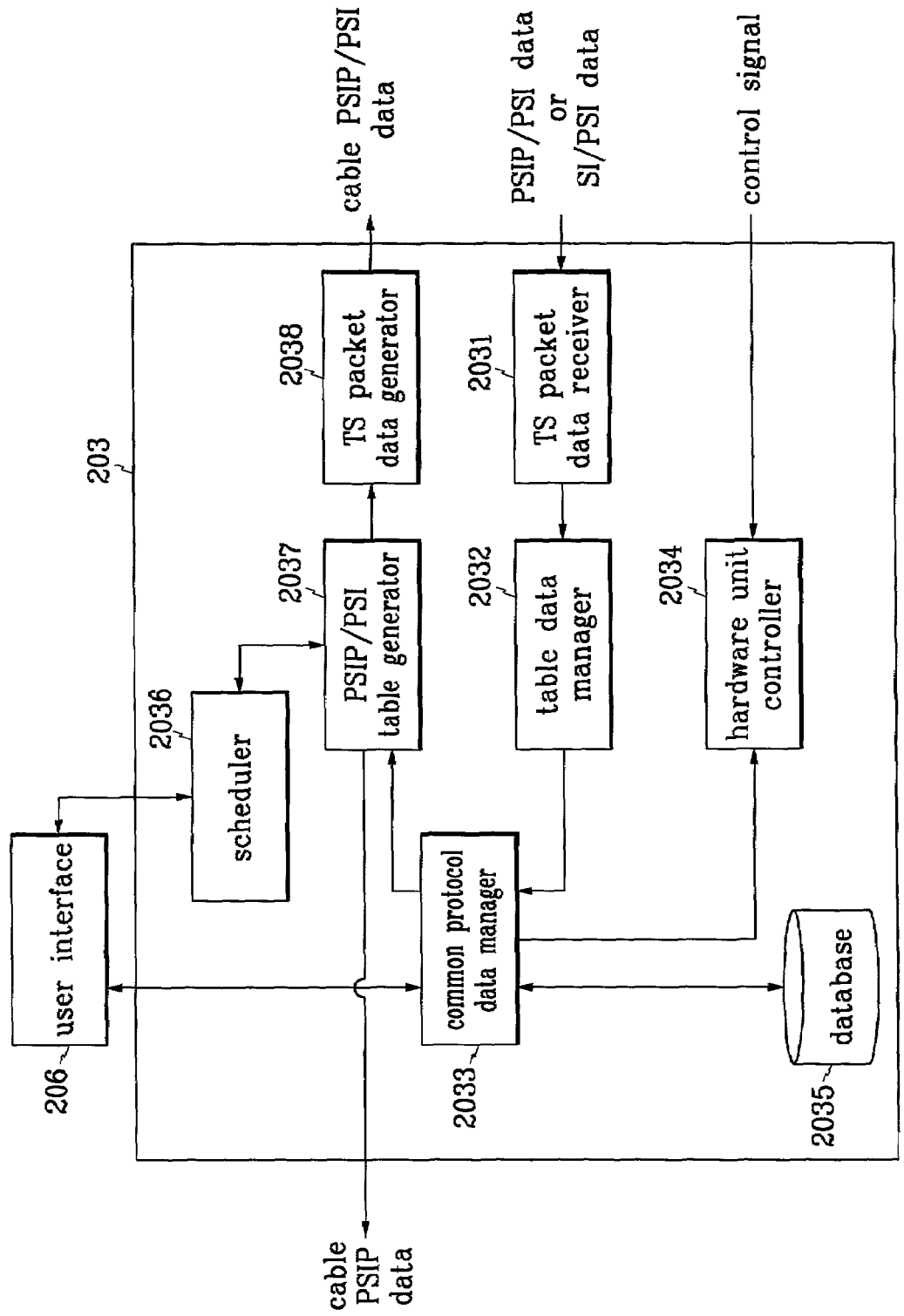

PSIP CONVERTER AND CONVERTING METHOD AND DIGITAL CABLE TELEVISION BROADCASTING SYSTEM USING THE PSIP CONVERTER

BACKGROUND OF THE INVENTION (a) Field of the Invention

The present invention relates to a digital cable television broadcasting system. More specifically, the present invention relates to a program and system information protocol (PSIP) converter for linking digital terrestrial broadcasting and digital satellite television broadcasting to a digital cable television broadcasting network in real-time, a PSIP converting method, and a digital cable television broadcasting system using the PSIP converter.

(b) Description of the Related Art

Currently, the Korean digital television broadcasting standards are classified into: terrestrial broadcasting on the Advanced Television Systems Committee (ATSC) basis, satellite broadcasting on the Digital Video Broadcasting (DVB) basis, and a cable broadcasting on the OpenCable basis, which is a temporary standard.

In this situation, it is very difficult to link terrestrial broadcasting or satellite broadcasting to a cable broadcasting network in real-time. This is because each broadcast's transport stream (TS) is commonly generated according to the international standard ISO/IEC 13818-1(MPEG-2 Part 1), but the protocol for transmitting program and system information is the PSIP in the case of terrestrial broadcasting, the protocol is a service information (SI) protocol in the case of satellite broadcasting, and the protocol is the PSIP which is identical with that of the terrestrial broadcasting but marginally differently applied compared with that of the terrestrial broadcasting in the case of cable broadcasting. Also, it is because the terrestrial broadcasting adopts the vestigial sideband (VSB) method, the satellite broadcasting adopts the quadrature phase shift keying (QPSK) method, and the cable broadcasting adopts the quadrature amplitude modulation (QAM) method in the modulation and demodulation method.

In particular, digital cable television broadcasting includes a method for transmitting the protocol and system information to an in-band channel for outputting broadcast TS, and a method for transmitting the same to an out-of-band channel for bi-directional data communication between a cable headend and a subscriber.

The case of the cable broadcasting PSIP (this will be referred to as a cable PSIP hereinafter) that is marginally differently applied when compared to the terrestrial broadcasting corresponds to the in-band channel transmission method, and the out-of-band transmission method uses the SI protocol of the SCTE standard (this will be referred to as a cable SI hereinafter) to transmit the program and system information on all the currently output channels.

The above-noted cable SI protocol is totally different from the DVB standard satellite broadcasting SI protocol.

The cable SI protocol includes cable PSIP data, defined broadcasting network information, and modulation and demodulation method information.

Therefore, cable broadcasting service providers must transmit PSIP data to the in-band channel, and cable SI data to the out-of-band channel. Here, the case of transmitting the cable PSIP data to the in-band channel only applies to a free-of-charge channel such as a duty retransmission, and in the case of a charged channel, only the cable SI data are transmitted to the out-of-band channel. The cable SI data are to be transmitted to all channels in the charged and free-of-charge channel cases.

Since broadcasting has become digitalized, conversion of modulation and demodulation of broadcasting signals and rearrangement of channel frequencies used for re-transmitting terrestrial television broadcasting and satellite television broadcasting in conventional analog television broadcasting no longer satisfies digital broadcasting environments. Since actual linking of broadcasting networks is impossible, a protocol conversion for analyzing the broadcasting signals must be developed.

SUMMARY OF THE INVENTION

It is an object of the present invention to provide a PSIP converter for converting in real-time the PSIP of terrestrial broadcasting and the SI protocol of satellite broadcasting into the PSIP of the cable broadcasting standard so as to link digital terrestrial broadcasting and satellite television broadcasting to a digital cable television broadcasting network in real-time, a PSIP converting method, and a digital cable television broadcasting system using the PSIP converter.

It is another object of the present invention to provide a PSIP converter for including cable PSIP data in cable SI data and transmitting them to an out-of-band channel, a PSIP converting method, and a digital cable television broadcasting system using the PSIP converter.

In one aspect of the present invention, a PSIP converter for selectively receiving a digital terrestrial broadcasting TS or a digital satellite broadcasting TS, converting them into a corresponding digital cable broadcasting TS, and outputting the same, comprises: a protocol data extractor for demultiplexing the terrestrial broadcasting TS or the satellite broadcasting TS, extracting audio/video (A/V) data and PSIP/PSI (program specific information) data from the terrestrial broadcasting TS, and extracting A/V data and SI (system information)/PSI data from the satellite broadcasting TS; a protocol data converter for using the PSIP/PSI data or the SI/PSI data extracted by the protocol data extractor, and generating PSIP/PSI data of a corresponding digital cable television broadcasting standard; a protocol data inserter for inserting the digital cable television broadcasting standard PSIP/PSI data generated by the protocol data converter into the A/V data extracted by the protocol data extractor through TS multiplexing, and generating a digital cable broadcasting TS; a system controller for checking states of the protocol data extractor, the protocol data converter and the protocol data inserter, and controlling their operation; a TS receiver for receiving the terrestrial broadcasting TS or the satellite broadcasting TS, and transmitting the same to the protocol data extractor; a TS transmitter for outputting the digital cable broadcasting TS generated by the protocol data inserter to the outside; and a user interface for receiving information and control data needed for generating the PSIP/PSI data of the digital cable television broadcasting standard.

In another aspect of the present invention, a PSIP conversion method for selectively receiving a digital terrestrial broadcasting TS or a digital satellite broadcasting TS, converting them into a corresponding digital cable broadcasting TS, and outputting the same, comprises: (a) receiving a program information description (PID) needed for analyzing the terrestrial broadcasting TS or the satellite broadcasting TS, information needed for protocol conversion, and data for other controls from a user; (b) converting the terrestrial broadcasting TS or the satellite broadcasting TS into an internally processed bit rate format; (c) filtering the converted terrestrial broadcasting TS or the satellite broadcasting TS using the PID to extract A/V data and PSIP/PSI data from the terrestrial broadcasting TS and extract A/V data and SI/PSI data from the satellite broadcasting TS; (d) analyzing the extracted PSIP/PSI data or the SI/PSI data to generate the corresponding digital cable broadcasting PSIP/PSI data; and (e) receiving the digital cable broadcasting PSIP/PSI data in (d) and the extracted A/V data in (c), performing TS multiplexing on them, and outputting them in the digital cable broadcasting TS.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 shows a detailed block diagram of a protocol data converter.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
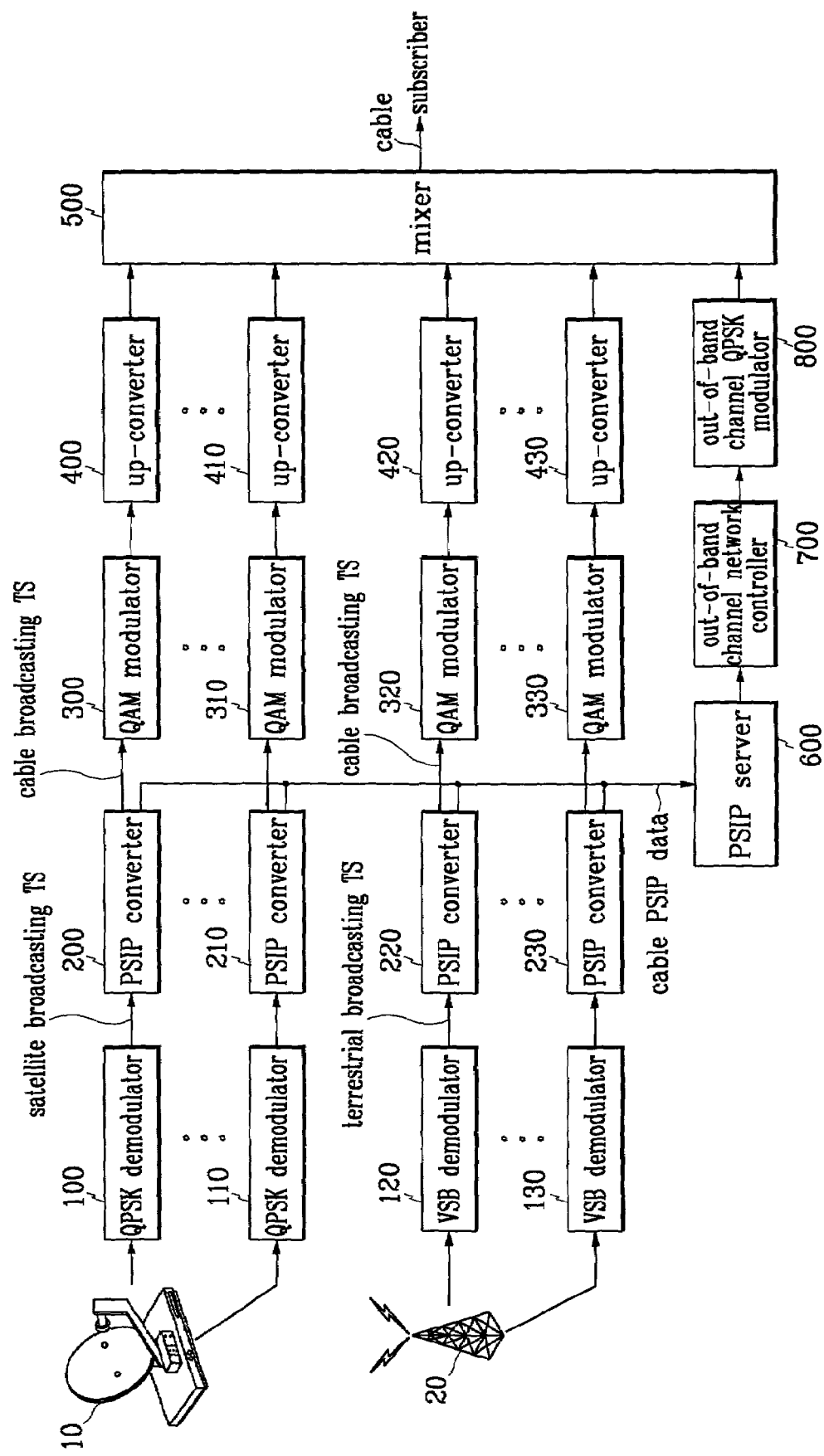
FIG. 1 shows a block diagram of a digital cable television broadcasting system according to a preferred embodiment of the present invention.

FIG. 1 shows a block diagram of a digital cable television broadcasting system according to a preferred embodiment of the present invention.

As shown, the digital cable television broadcasting system comprises a satellite broadcasting antenna 10; a terrestrial broadcasting antenna 20; QPSK demodulators 100 and 110; VSB demodulators 120 and 130; PSIP converters 200, 210, 220, and 230; QAM modulators 300, 310, 320, and 330; up-converters 400, 410, 420, and 430; a PSIP server 600; an out-of-band channel network controller 700, an out-of-band channel QPSK modulator 800; and a mixer 500.

Among them, the satellite broadcasting antenna 10, the QPSK demodulators 100 and 110, the PSIP converters 200 and 210, the QAM modulators 300 and 310, the up-converters 400 and 410, and the mixer 500 are used to link digital satellite television broadcasting to a digital cable television broadcasting network in real-time.

Also, the terrestrial broadcasting antenna 20, the VSB demodulators 120 and 130, the PSIP converters 220 and 230, the QAM modulators 320 and 330, the up-converters 420 and 430, and the mixer 500 are used to link digital terrestrial television broadcasting to the digital cable television broadcasting network in real-time.

First, in order to link the digital satellite television broadcasting to the digital cable television broadcasting network in real-time, the satellite broadcasting antenna 10 receives digital satellite television broadcasting signals, a tuner (not illustrated) tunes the received signals for each channel, and the tuned signals are transmitted to the QPSK demodulators 100 and 110. Here, the channel represents an actual channel.

The QPSK demodulators 100 and 110 demodulate the digital satellite television broadcasting signals tuned and input for each channel, and output a satellite broadcasting TS of the MPEG-2 TS format to the PSIP converters 200 and 210.

The PSIP converters 200 and 210 analyze the satellite broadcasting TS input by the QPSK demodulators 100 and 110, convert an SI/PSI (program specific information) table for transmitting program and system information into a PSIP/PSI table of a digital cable television broadcasting standard, and generate a cable broadcasting TS.

The QAM modulators 300 and 310 modulate the cable broadcasting TS generated by the PSIP converters 200 and 210 to transmit them to a subscriber.

The up-converters 400 and 410 convert the signals modulated by the QAM modulators 300 and 310 into radio frequency (RF) signals, and output them through the mixer 500.

The mixer 500 transmits the signals converted by the up-converters 400 and 410 to a user through a cable broadcasting network.

In a like manner, in order to link digital terrestrial television broadcasting to the digital cable television broadcasting network in real-time, the terrestrial broadcasting antenna 20 receives digital terrestrial television broadcasting signals, a tuner (not illustrated) tunes the signals for each channel, and the tuned signals are transmitted to the VSB demodulators 120 and 130.

The VSB demodulators 120 and 130 demodulate the digital terrestrial television broadcasting signals tuned and input for each channel, and output a terrestrial broadcasting TS of the MPEG-2 TS format to the PSIP converters 220 and 230.

The PSIP converters 220 and 230 analyze the terrestrial broadcasting TS input by the VSB demodulators 120 and 130, convert an PSIP/PSI table for transmitting program and system information into a PSIP/PSI table of a digital cable television broadcasting standard, and generate a cable broadcasting TS.

The QAM modulators 320 and 330 modulate the cable broadcasting TS generated by the PSIP converters 220 and 230 to transmit them to a subscriber.

The up-converters 420 and 430 convert the signals modulated by the QAM modulators 320 and 330 into RF signals, and output them to the mixer 500.

The mixer 500 transmits the signals converted by the up-converters 420 and 430 to a user through the cable broadcasting network.

The PSIP server 600 receives cable PSIP data generated by the PSIP converters 200, 210, 220, and 230, and include them in cable SI data to be transmitted to an out-of-band channel.

The out-of-band channel network controller 700 controls the cable SI data transmitted to the out-of-band channel QPSK modulator 800 from the PSIP server 600.

The out-of-band channel QPSK modulator 800 modulates the cable SI data generated by the PSIP server 600 to transmit them to a subscriber through an out-of-band channel.

As described, since the PSIP converters 200, 210, 220, and 230 convert the SI/PSI table included in the satellite broadcasting TS and the PSIP/PSI table included in the terrestrial broadcasting TS into the PSIP/PSI tables of the digital cable television broadcasting standard to generate the cable broadcasting TS, the digital terrestrial broadcasting and the digital satellite television broadcasting can be linked to the digital cable television network in real-time.

Figure 2:
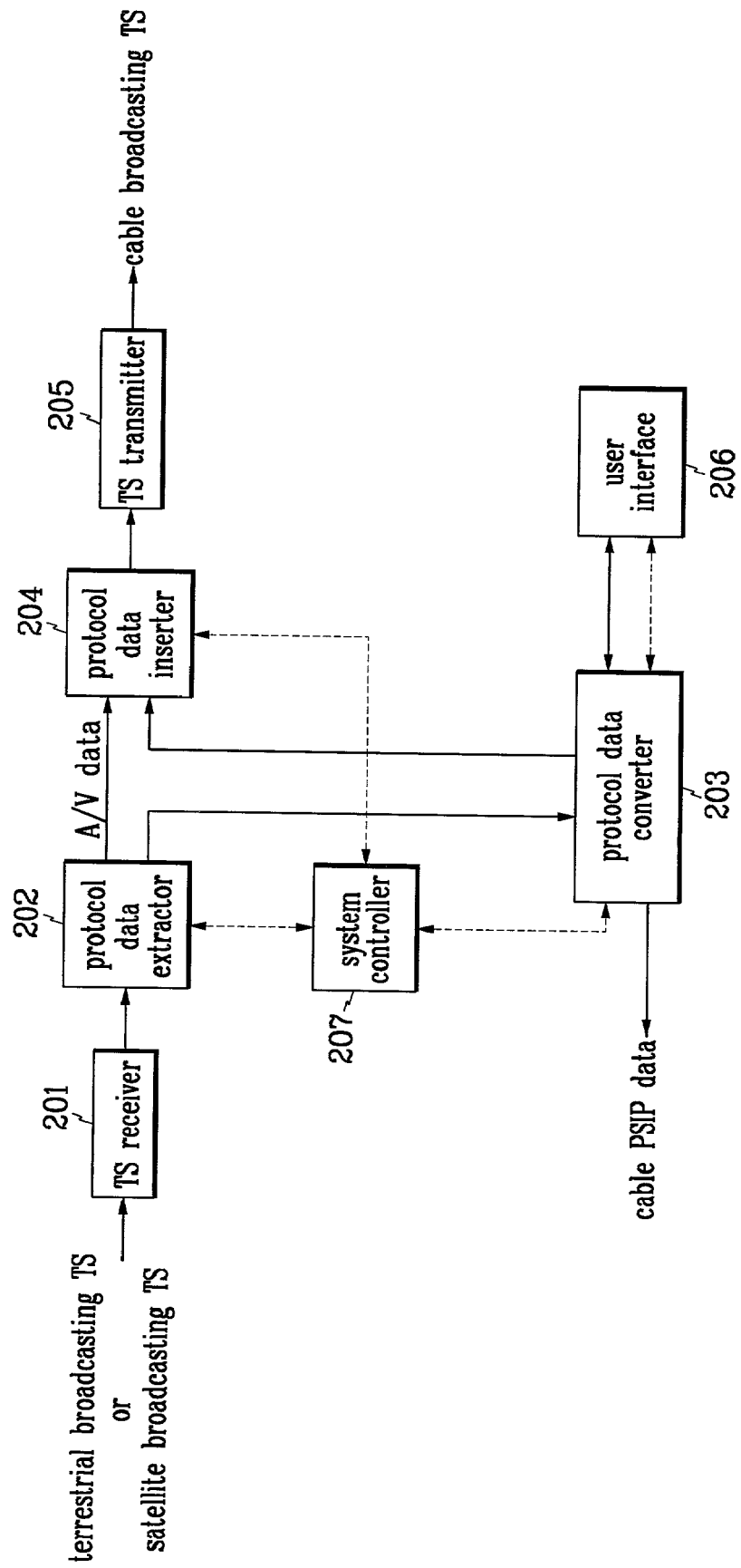
FIG. 2 shows a first detailed block diagram of a PSIP converter of FIG. 1.

FIG. 2 shows a detailed block diagram of one of the PSIP converters 200 to 230 of FIG. 1.

As shown, the PSIP converter 200 comprises a TS receiver 210; a protocol data extractor 202; a protocol data converter 203; a protocol data inserter 204; a TS transmitter 205; a user interface 206; and a system controller 207.

The TS receiver 201 receives a satellite broadcasting TS from the QPSK demodulators 100 and 110 or a terrestrial broadcasting TS from the VSB demodulators 120 and 130.

The protocol data extractor 202 performs TS-demultiplexing to extract audio/video (A/V) data and SI/PSI data from the satellite broadcasting TS received through the TS receiver 201 or the A/V data and the PSIP/PSI data from the terrestrial broadcasting TS.

The protocol data converter 203 uses the PSIP/PSI data or the SI/PSI data extracted by the protocol data extractor 202 to generate PSIP/PSI data of the cable broadcasting standard.

The user interface 206 receives information and control data needed for generating the PSIP/PSI data from the user, and in particular, from a system manager.

The protocol data inserter 204 inserts the PSIP/PSI data generated by the protocol data converter 203 into the A/V data extracted by the protocol data extractor 202 through TS multiplexing.

The TS transmitter 205 outputs the cable broadcasting TS generated by the protocol data inserter 204 to the QAM modulators 300 to 330.

The system controller 207 checks the above units 202, 203, 204, and 206 and controls their operation.

An operation of the PSIP converter 200 according to a preferred embodiment of the present invention will now be described.

First, a packet identifier (PID) needed for analyzing the terrestrial broadcasting TS or the satellite broadcasting TS input in the initialization of the PSIP converter 200, information needed for protocol conversion, and data needed for other control are provided by a user through the user interface 206.

Next, when receiving the satellite broadcasting TS from the QPSK demodulators 100 and 110 or the terrestrial broadcasting TS from the VSB demodulators 120 and 130, the TS receiver 201 determines whether they fit the ATSC or the DVB standard, converts them into an internally processed bit rate format, and outputs them to the protocol data extractor 202.

The protocol data extractor 202 performs PID filtering on the terrestrial broadcasting TS or the satellite broadcasting TS input through the TS receiver 201, and splits the A/V data, the PSIP/PSI data, or the SI/PSI data. The split A/V data are output to the protocol data inserter 204, and the PSIP/PSI data or the SI/PSI data are output to the protocol data converter 203.

The protocol data converter 203 analyzes the terrestrial broadcasting PSIP/PSI data input by the protocol data extractor 202 or the satellite broadcasting SI/PSI data, generates cable PSIP/PSI data, outputs the cable PSIP/PSI data to the protocol data inserter 204, and also outputs the generated cable PSIP data to the PSIP server 600 so as to include the cable PSIP data in the cable SI data and transmit the cable SI data together with the cable PSIP data to the out-of-band channel.

The protocol data inserter 204 receives cable PSIP/PSI data from the protocol data converter 203 and the A/V data from the protocol data extractor 202, and performs TS multiplexing to amend variations of a program clock reference (PCR), convert the multiplexed TS according to an output bit rate, and output the same to the TS transmitter 205.

The TS transmitter 205 outputs the TS according to the cable broadcasting standard's signals input by the protocol data inserter 204.

Figure 3:
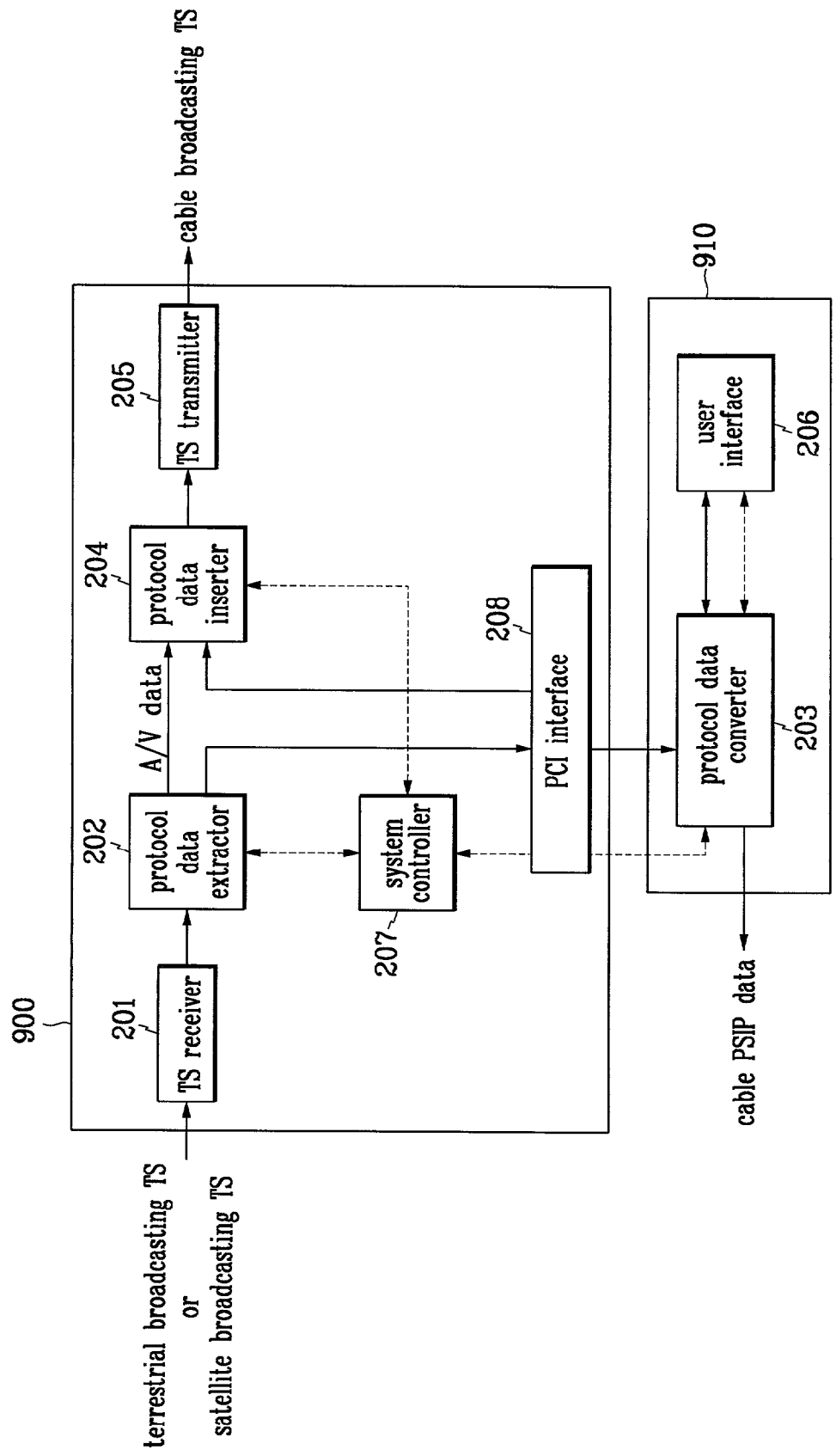
FIG. 3 shows a second detailed block diagram of a PSIP converter of FIG. 1.

In the above, it is assumed that all the units are located in the same system or same hardware block, and as shown in FIG. 3, the protocol data converter 203 and the user interface 206 can be implemented in a different system or another hardware block.

As shown in FIG. 3, the TS receiver 201, the protocol data extractor 202, the protocol data inserter 204, the TS transmitter 205, and the system controller 207 are implemented in a single system 900 such as a personal computer (PC) or in a single hardware block 900 such as a PCI board that can be installed in a Windows NT workstation, and the protocol data converter 203 and the user interface 206 are implemented in another system 910 such as a Windows NT workstation. In this instance, when the hardware block 900 is a PCI board, a PCI interface 208 for connecting the protocol data extractor 202, the protocol data inserter 204, and the system controller 207 with the protocol data converter 203 is required to be implemented in the hardware block 900. Also, a PCI interface is needed in a system 910 connected to the PCI interface 208 of the hardware block 900, and conventionally, since a PCI socket for providing a PCI interface function is installed in the Windows NT workstation, the PCI interface function is obviously possible, which can be easily understood by a skilled person.

FIG. 4 shows a detailed block diagram of the protocol data converter 203 of FIG. 3.

As shown, the protocol data converter 203 comprises a TS packet data receiver 2031; a table data manager 2032; a common protocol data manager 2033; a database 2035; a scheduler 2036; a PSIP/PSI table generator 2037; and a TS packet data generator 2038.

In general, terrestrial PSIP/PSI data, satellite SI/PSI data, and cable PSIP/PSI data respectively include tables.

Here, commonly included PSI data comprise a program association table (PAT); a conditional access table (CAT); and a program map table (PMT) of the MPEG-2 standard.

Terrestrial PSIP data comprise a master guide table (MGT); a system time table (STT); a rating region table (RRT); a television virtual channel table (TVCT); an event information table (EIT); and an extended text table (EET). Satellite SI data comprise a network information table (NIT); a service description table (SDT); an EIT; and a time data table (TDT). Cable PSIP data comprise an MGT; an STT; an RRT; a cable virtual channel table (CVCT); an EIT; and an ETT in a similar manner to the terrestrial PSIP data.

As described above, since tables of the terrestrial PSIP/PSI are matched with those of the cable PSIP/PSI one by one, a protocol conversion process is easily executed.

However, much additional information is required to convert the satellite SI/PSI into cable PSIP/PSI. Minor modification is needed in this conversion since the PSI tables are commonly used. However, so as to convert the satellite SI tables into cable PSIP tables, much information must be input from the user, and in particular, from the system manager. Therefore, as shown in FIG. 4, an information input process through the common protocol data manager 2033 and the user interface 206 is essential for the protocol conversion.

First, in order to convert the PSIP/PSI data of the terrestrial broadcasting or the SI/PSI data of the satellite broadcasting into the PSIP/PSI data of the cable broadcasting standard, the TS packet data receiver 2031 receives the PSIP/PSI data of the terrestrial broadcasting or the SI/PSI data of the satellite broadcasting from the protocol data extractor 202, and transmits them to the table data manager 2032.

The table data manager 2032 receives the PSIP/PSI data or the SI/PSI data through the TS packet data receiver 2031, splits them according to tables corresponding to the PSIP or the SI and the PSI, extracts data for generating cable PSIP/PSI tables, and outputs them to the common protocol data manager 2033.

The common protocol data manager 2033 uses the data extracted by the table data manager 2032, the data input by the system manager through the user interface 206, and the data stored in the database 2035 to configure data needed for generating cable PSIP/PSI tables, and outputs them to the PSIP/PSI table generator 2037.

The PSIP/PSI table generator 2037 generates a cable PSIP/PSI table using the data input according to control signals corresponding to a generation period of each table of the scheduler 2036, and outputs it to the TS packet data generator 2038, and also transmits it to the PSIP server 600 through the Ethernet so as to include the generated cable PSIP data in the cable SI data transmitted to the out-of-band channel and transmit the same.

The TS packet data generator 2038 receives the cable PSIP/PSI tables from the PSIP/PSI table generator 2037, configures them in the MPEG-2 TS packets, and transmits them to the protocol data inserter 204.

Through this process, the terrestrial broadcasting TS and the satellite broadcasting TS are completely converted into the cable broadcasting TS, and therefore the terrestrial broadcasting, the satellite communication network, and the cable broadcasting network are easily linked in real-time.

In the above, it is assumed that the protocol data converter 203 is implemented as a hardware block, and without being restricted to this, the protocol data converter 203 can be implemented in a software block. In this case, as shown in FIG. 4, a hardware unit controller 2034 for communicating control signals with the system controller 207 for controlling the operation of the hardware components is required, and the hardware unit controller 2034 controls transmission of control signals between the units of the protocol data converter 203 comprising software blocks, and in particular, between the common protocol data manager 2033 and the system controller 207.

According to the present invention, the terrestrial broadcasting PSIP protocol and the satellite broadcasting SI protocol for transmitting program and system information are converted into the cable broadcasting standard PSIP protocol in real-time, and accordingly, the digital terrestrial television broadcasting and the digital satellite television broadcasting can be linked to the digital cable television broadcasting network in real-time. By this, the present invention can be efficiently used for obtaining the cable broadcasting station's contents and duty retransmission, and the cable television broadcasting subscribers can view the digital terrestrial broadcasting and the satellite television broadcasting through the cable broadcasting without an additional terrestrial broadcasting or satellite broadcasting receiving terminal. In the future, the present invention will be a technique needed for a general network configuration of the digital television broadcasting.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A program and system information protocol (PSIP) converter for selectively receiving a digital terrestrial broadcasting transport stream (TS) or a digital satellite broadcasting TS, converting them into a corresponding digital cable broadcasting TS, and outputting the same, said PSI converter comprising:
a protocol data extractor for demultiplexing the terrestrial broadcasting TS or the satellite broadcasting TS, extracting audio/video (MV) data and PSIP/PSI (program specific information) data from the terrestrial broadcasting TS, and extracting A/V data and SI (system information)/PSI data from the satellite broadcasting TS;
a protocol data converter for converting the PSIP/PSI data or the SI/PSI data extracted by the protocol data extractor into PSIP/PSI data of a corresponding digital cable television broadcasting standard;
a protocol data inserter for inserting the digital cable television broadcasting standard PSIP/PSI data generated by the protocol data converter into the A/V data extracted by the protocol data extractor through TS multiplexing, and generating a digital cable broadcasting TS; and
a system controller for checking states of the protocol data extractor, the protocol data converter and the protocol data inserter, and controlling their operation;
wherein the protocol data converter comprises:
a table data manager for receiving the terrestrial broadcasting PSIP/PSI data or the satellite broadcasting SI/PSI data from the protocol data extractor, splitting them according to tables corresponding to the PSIP or the SI and the PSI, and extracting data for generating digital cable broadcasting PSIP/PSI tables;
a common protocol data manager for using the data extracted by the table data manager, a data input by a system manager through an user interface, and data stored in a database to configure data needed for generating the digital cable broadcasting PSIP/PSI tables;
a scheduler for outputting control signals corresponding to each table generation period of the digital cable broadcasting PSIP/PSI; and
a PSIP/PSI table generator for generating the digital cable broadcasting PSIP/PSI tables by using the data input by the common protocol data manager according to the control signals outputted by the scheduler, and outputting the same to the protocol data inserter.

2. The PSIP converter of claim 1, further comprising:
a TS receiver for receiving the terrestrial broadcasting TS or the satellite broadcasting TS, and transmitting the same to the protocol data extractor;
a TS transmitter for outputting the digital cable broadcasting TS generated by the protocol data inserter to the outside; and
said user interface coupled to said protocol data converter for receiving, from the system manager, the data input needed for generating the PSIP/PSI data of the digital cable television broadcasting standard.

3. The PSIP converter of claim 1, wherein the PSIP/PSI table generator is arranged for transmitting the digital cable broadcasting PSIP data to a PSIP server through a predetermined network so that the digital cable broadcasting PSIP data are included in the digital cable SI data and transmitted to a subscriber, the PSIP server transmitting the digital cable SI data to the subscriber though an out-of-band channel.

4. The PSIP converter of claim 1, further comprising:
a TS data receiver for receiving the terrestrial broadcasting PSIP/PSI data or the satellite broadcasting SI/PSI data from the protocol data extractor; and
a TS packet data generator for configuring the digital cable broadcasting PSIP/PSI table generated by the PSIP/PSI table generator into MPEG-2 TS packets, and transmitting said packets to the protocol data inserter.

5. A program and system information protocol (PSIP) conversion method for selectively receiving a digital terrestrial broadcasting transport stream (TS) or a digital satellite broadcasting TS, converting the selectively received TS into a corresponding digital cable broadcasting TS, and outputting the corresponding digital cable broadcasting TS, said method comprising:
   (a) receiving a program information description (PD) needed for analyzing the terrestrial broadcasting TS or the satellite broadcasting TS, information needed for protocol conversion, and data for other controls from a user;
   (b) converting the terrestrial broadcasting TS or the satellite broadcasting TS into an internally processed bit rate format;
   (c) filtering the converted terrestrial broadcasting TS or the satellite broadcasting TS using the PID to extract A/V data and PSIP/PSI data from the terrestrial broadcasting TS and extract A/V data and SI/PSI data from the satellite broadcasting TS;
   (d) analyzing and converting the extracted PSIP/PSI data or the SI/PSI data into the corresponding digital cable broadcasting PSIP/PSI data; and
   (e) receiving the digital cable broadcasting PSIP/PSI data in (d) and the extracted A/V data in (c), performing TS multiplexing on the received digital cable broadcasting PSIP/PSI data and extracted A/V data, and outputting the TS multiplexed data in the digital cable broadcasting TS;
   wherein the analyzing and converting in (d) comprises:
   (d1) splitting the PSIP/PSI data extracted from the terrestrial broadcasting TS or the SI/PSI data extracted from the satellite broadcasting TS according to tables corresponding to the PSI or the SI and the PSI, and extracting data for generating respective digital cable broadcasting PSIP/PSI tables;
   (d2) using the data extracted in (d1), data inputted by a system manager though an user interface, and data stored in a database to configure data needed for generating the digital cable broadcasting PSIP/PSI tables;
   (d3) outputting control signals corresponding to each table generation period of the digital cable broadcasting PSIP/PSI tables; and
   (d4) generating the digital cable broadcasting PSIP/PSI tables by using the data configured at (d2) according to the control signals outputted at (d3).

6. The PSI conversion method of claim 5, further comprising:
   including the digital cable broadcasting PSI data in (d) in the digital cable SI data; and
   transmitting the digital cable SI data inclusive of the digital cable broadcasting PSI data to a subscriber through an out-of-band channel,
   wherein said including is performed independently of said TS multiplexing at (e).

7. The PSI conversion method of claim 5, wherein the multiplexing process in (e) comprises:
   amending variations of a program clock reference (PCR), and converting the multiplexed TS according to an output bit rate.

8. A digital cable television broadcasting system for selectively receiving digital terrestrial broadcasting or digital satellite television broadcasting signals and linking the selectively received signals to a digital cable broadcasting network in real-time, said system comprising:
   a plurality of first and second broadcasting signal demodulators for demodulating the digital terrestrial broadcasting signals and the digital satellite television broadcasting signals, respectively, and outputting the demodulated signals in terrestrial broadcasting transport streams (TS) and satellite broadcasting TS, respectively;
   a plurality of first and second program and system information protocol (PSIP) converters for analyzing the terrestrial broadcasting TS and the satellite broadcasting TS outputted by the broadcasting signal demodulators, respectively, converting a terrestrial broadcasting PSIP/PSI table and a satellite television broadcasting SI/PSI table extracted from the analyzed TS into digital cable broadcasting PSIP/PSI tables, respectively, and outputting a cable broadcasting TS based on the digital cable broadcasting PSIP/PSI tables;
   a plurality of broadcasting signal modulators for modulating the cable broadcasting TS outputted by the PSIP converters;
   a plurality of up-converters for up-converting the cable broadcasting TS modulated by the broadcasting signal modulators into radio frequency (RF) signals; and
   a mixer for mixing the cable broadcasting TS up-converted by the up-converters, and transmitting the mixed cable broadcasting TS, via a cable to a subscriber;
   wherein each of said first and second PSIP converters comprises a protocol data converter which, in turn, comprises:
   a table data manager for receiving the extracted terrestrial broadcasting PSIP/PSI table and satellite television broadcasting SI/PSI table, and extracting therefrom data for generating the digital cable broadcasting PSIP/PSI tables:
   a common protocol data manager for using the data extracted by the table data manager, data inputted by a system manager though an user interface, and data stored in a database to configure data needed for generating the digital cable broadcasting PSIP/PSI tables;
   a scheduler for outputting control signals corresponding to each table generation period of the digital cable broadcasting PSIP/PSI tables; and
   a PSIP/PSI table generator for generating the digital cable broadcasting PSIP/PSI tables by using the data inputted by the common protocol data manager according to the control signals outputted by the scheduler.

9. The digital cable television broadcasting system of claim 8, further comprising:
   a terrestrial broadcasting antenna for receiving the digital terrestrial broadcasting and outputting corresponding broadcasting signals to the first broadcasting signal demodulator; and
   a satellite broadcasting antenna for receiving the digital satellite television broadcasting and outputting corresponding broadcasting signals to the second broadcasting signal demodulator.

10. The digital cable television broadcasting system of claim 8, further comprising:
   a PSI server for receiving digital cable broadcasting PSIP/PSI table generated by the PSI converters, and including the received digital cable broadcasting PSIP/PSI table in digital cable SI data to be transmitted to the subscriber via an out-of-band channel;
   an out-of-band channel signal modulator for modulating the digital cable SI data generated by the PSI server, and transmitting the modulated digital cable SI data to the subscriber though the out-of-band channel; and an out-of-band channel network controller for controlling the cable SI data transmitted to the out-of-band channel signal modulator from the PSI server.

11. The digital cable television broadcasting system of claim 8, wherein the first PSI converter further comprises:

a protocol data extractor for demultiplexing the terrestrial broadcasting TS and extracting audio/video (A/V) data and PSIP/PSI data from the terrestrial broadcasting TS;

said protocol data converter for using the PSIP/PSI data extracted by the protocol data extractor to generate PSIP/PSI data of a corresponding digital cable television broadcasting standard in form of the digital cable broadcasting PSIP/PSI table;

a protocol data inserter for inserting the PSIP/PSI data generated by the protocol data converter into the A/V data extracted by the protocol data extractor through TS multiplexing, and generating the digital cable broadcasting TS; and a system controller for checking and controlling the protocol data extractor, the protocol data converter, and the protocol data inserter.

12. The digital cable television broadcasting system of claim 8, wherein the second PSIP converter further comprises:

a protocol data extractor for demultiplexing the satellite broadcasting TS and extracting A/V data and SI/PSI data from the satellite broadcasting TS;

said protocol data converter for using the SI/PSI data extracted by the protocol data extractor to generate PSIP/PSI data of a corresponding digital cable television broadcasting standard in form of the digital cable broadcasting PSIP/PSI table;

a protocol data inserter for inserting the PSIP/PSI data generated by the protocol data converter into the A/V data extracted by the protocol data extractor through TS multiplexing, and generating the digital cable broadcasting TS; and a system controller for checking and controlling the protocol data extractor, the protocol data converter, and the protocol data inserter.

* * * * *